(12) United States Patent
Hironaka

(10) Patent No.: US 6,627,690 B1
(45) Date of Patent: Sep. 30, 2003

(54) FLAME-RETARDANT POLYESTER RESIN COMPOSITION, MOLDED ARTICLE THEREOF, AND METHOD OF MOLDING THE SAME

(75) Inventor: Katsuhiko Hironaka, Chiba (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 10/070,739

(22) PCT Filed: Sep. 29, 2000

(86) PCT No.: PCT/JP00/06762

§ 371 (c)(1), (2), (4) Date: Mar. 12, 2002

(87) PCT Pub. No.: WO01/25332

PCT Pub. Date: Apr. 12, 2001

(30) Foreign Application Priority Data

Oct. 1, 1999 (JP) ............................................ 11-281441

(51) Int. Cl.[7] .............................. C08J 5/10; C08K 3/10; C08K 3/16; C08L 67/00
(52) U.S. Cl. ....................................................... 524/412
(58) Field of Search ......................................... 524/412

(56) References Cited

U.S. PATENT DOCUMENTS 5,034,439 A * 7/1991 Breitenfellner et al. ....... 524/94
5,250,595 A * 10/1993 Miyashita et al. .......... 524/114
5,945,460 A    8/1999 Ekart et al.

FOREIGN PATENT DOCUMENTS

| EP | 08183896 A1 | 7/1996 |
|---|---|---|
| EP | 11106615 A1 | 4/1999 |
| JP | 58-118849 | 7/1983 |
| JP | 62-169847 | 7/1987 |
| JP | 08-183896 | 7/1996 |
| JP | 10-130481 | 5/1998 |
| JP | 11-106615 | 4/1999 |

OTHER PUBLICATIONS

Supplementary European Search Report dated Mar. 31, 2003.

* cited by examiner

Primary Examiner—James J. Seidleck
Assistant Examiner—U. K. Rajguru
(74) Attorney, Agent, or Firm—Rader, Fishman & Grauer PLLC

(57) ABSTRACT

A flame-retardant composition comprising (A) 100 parts by weight of an aromatic polyester having a terminal carboxyl group concentration of 60 equivalents/ton or less; (B1) a specific brominated epoxy compound and (B2) a brominated polyacrylate in the amount of 5 to 50 parts by weight; (C) 2 to 20 parts by weight of antimony trioxide, and the (B1)/(B2) weight ratio being 5/95 to 95/5.

The composition has superior excellent residence stability than a composition used for a brominated epoxy compound alone as a flame retardant.

7 Claims, No Drawings

FLAME-RETARDANT POLYESTER RESIN COMPOSITION, MOLDED ARTICLE THEREOF, AND METHOD OF MOLDING THE SAME

TECHNICAL FIELD OF THE INVENTION

The present invention relates to a flame-retardant polyester resin composition, molded products thereof and a molding method therefor and, more specifically, to a flame-retardant polyester resin composition which has excellent heat resistance, flame retardancy and moldability, molded products thereof and a molding method therefor.

PRIOR ART

Polyester resins have been increasingly used in electric and electronic parts, auto parts and mechanical parts thanks to their excellent heat resistance, mechanical properties and chemical resistance. In the field of electric and electronic parts, flame retardancy is also strongly sought for from the viewpoint of safety against fires and a composition comprising a flame retardant is used.

Although brominated polycarbonate oligomers and brominated epoxy oligomers have been studied as flame retardants for polyester resins, excellent moldability such as high fluidity and residence stability have been required of polyester resin compositions to meet demand for lightweight and small-sized electric and electronic parts as well as demand for improved productivity.

The brominated polycarbonate oligomers which have been widely used as a flame retardant for polyester resins have such problems as poor fluidity and low residence stability because it causes an ester exchange reaction with a polyester. The brominated epoxy oligomers have such a defect that their viscosity is considerably increased by residence due to a reaction between the terminal epoxy group thereof and the terminal carboxyl group of a polyester particularly when they contain antimony trioxide as a flame retarding aid though they have high fluidity.

To solve the above problems of the brominated epoxy oligomers, JP-A 58-118849 (the term "JP-A" as used herein means an "unexamined published Japanese patent application") discloses use of a brominated epoxy compound having an average polymerization degree of 11 or more and JP-A 62-169847 discloses use of two different brominated epoxy compounds having polymerization degrees of 20 or more and 0 to 10.

Although various attempts have been made to reduce reactivity by capping the terminal epoxy group of the brominated epoxy compound with another compound, a new step for capping the terminal is necessary, thereby losing economical efficiency.

Meanwhile, brominated polyacrylates are used as a flame retardant for polyester resins and have excellent fluidity. However, brominated polyacrylates do not show sufficient residence stability due to an ester exchange reaction with a polyester resin.

In recent years, importance has been attached to use of regenerated materials and recovered materials as part of efforts to improve productivity. JP-A 10-130481 discloses that even when a polyester resin composition which is flame retarded with a brominated polyacrylate is molded using a large amount of its regenerated material, the obtained molded product has excellent characteristic properties. However, both brominated epoxy compound-containing polyester resins and brominated acrylate-containing polyester resins have such a problem that changes in viscosity caused by the residence lead to fluctuations in molding conditions when a regenerated material is used, thereby reducing productivity.

With the technology of the prior art, use of a high molecular weight brominated epoxy compound reduces the fluidity of a resin and use of a low molecular weight brominated epoxy oligomer in combination with the above brominated epoxy compound does not improve the residence stability of a composition completely. Thus, it is difficult to achieve both fluidity and residence stability at the same time.

When a brominated epoxy compound is used to flame retard a resin, use of a polymer having a small amount of a terminal carboxyl group as a polyester resin which reacts with the epoxy group is effective to some extent but still unsatisfactory to adopt broader molding conditions.

The present invention has been made in view of the above circumstances.

SUMMARY OF THE INVENTION

That is, it is an object of the present invention to provide a flame-retardant polyester composition having excellent moldability such as fluidity and residence stability.

It is another object of the present invention to provide a method of molding the above flame-retardant polyester composition of the present invention.

It is still another object of the present invention to provide a molded product of the above flame-retardant polyester composition of the present invention.

The further objects and advantages of the present invention will become apparent from the following description.

Firstly, according to the present invention, the above objects and advantages of the present invention are attained by a flame-retardant polyester composition (may be referred to as "first composition of the present invention" hereinafter) comprising;

(A) 100 parts by weight of an aromatic polyester having a terminal carboxyl group concentration of 60 equivalents/ton or less;
(B) 5 to 50 parts by weight of flame retardants consisting of
(B1) a brominated epoxy compound represented by the following formula (1):

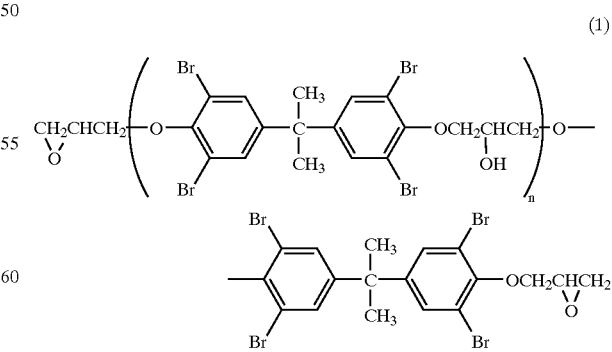

wherein n is a number of 11 to 50,
and (B2) a brominated polyacrylate represented by the following formula (2):

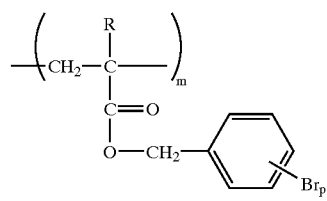

(2)

wherein R is a hydrogen atom or methyl group, p is a number of 1 to 5, and m is a number of 20 to 160, the (B1)/(B2) weight ratio being 5/95 to 95/5; and
(C) 2 to 20 parts by weight of antimony trioxide.

Secondly, according to the present invention, the above objects and advantages of the present invention are attained by a flame-retardant polyester composition (may be referred to as "second composition of the present invention" hereinafter) comprising the above components (A), (B) and (C), and
(D) 5 to 100 parts by weight of a fibrous inorganic filler.

Thirdly, according to the present invention, the above objects and advantages of the present invention are attained by a method of producing a molded product of a flame-retardant polyester composition, characterized in that the flame-retardant polyester composition is a mixture of 50 to 75 wt % of the first composition or the second composition of the present invention which is not used for molding yet and 50 to 25 wt % of the first composition or the second composition of the present invention which contains the same type of a flame retardant in the same amount as the above composition and which has already been used for molding and recovered.

In the fourth place, according to the present invention, the above objects and advantages of the present invention are attained by use of the first composition or the second composition of the present invention which has already been used for molding and recovered as a raw material to be mixed with the first composition or the second composition of the present invention which is not used for molding yet to produce a molded product.

Finally, according to the present invention, the above objects and advantages of the present invention are attained by a molded product of the first composition or the second composition of the present invention.

DETAILED DESCRIPTION OF THE PREFERRED EMBODIMENT

The present invention will be described in detail hereinafter.

(A) Aromatic Polyester

The aromatic polyester as the component (A) used in the present invention comprises dicarboxylic acid components and diol components. The dicarboxylic acid components include terephthalic acid, isophthalic acid and phthalic acid; phthalic acid derivatives such as methyl terephthalate and methyl isophthalate; and naphthalenedicarboxylic acid and derivatives thereof such as 2,6-naphthalenedicarboxylic acid, 2,7-naphthalenedicarboxylic acid and 1,5-naphthalenedicarboxylic acid. The diol components include aliphatic diols such as ethylene glycol, propylene glycol, tetramethylene glycol, hexamethylene glycol and neopentyl glycol.

Preferred examples of the aromatic polyester (A) include polytetramethylene terephthalate, polyethylene terephthalate, polyethylene-2,6-naphthalene dicarboxylate and polytetramethylene-2,6-naphthalene dicarboxylate. Out of these, polytetramethylene terephthalate is particularly preferred because it is excellent in the balance between characteristic properties and moldability.

An aromatic polyester prepared by substituting part of the above polyester with a copolymerizable component may be used as the aromatic polyester. The amount of the copolymerizable component is preferably 10 mol % or less based on the total of all the dicarboxylic acid components.

Further, the above aromatic polyesters may be used in combination of two or more.

The aromatic polyester used in the present invention has a terminal carboxyl group concentration [COOH] of 60 equivalents/ton or less, preferably less than 30 equivalents/ton. The terminal carboxyl group concentration [COOH] is measured by an A. Conix method (Makromol. Chem., vol. 26, pp. 226, 1958). When the terminal carboxyl group concentration is higher than 60 equivalents/ton, a reaction between the aromatic polyester and the brominated epoxy compound as the component (B) becomes marked, thereby making it difficult to obtain the effect of the present invention. When an aromatic polyester having a terminal carboxyl group concentration of less than 30 equivalents/ton is used, moldability further improves advantageously.

The intrinsic viscosity of the aromatic polyester used in the present invention is 0.5 or more, preferably 0.6 to 1.2, particularly preferably 0.7 to 1.0 when it is measured in o-chlorophenol at 35° C.

The aromatic polyester having a terminal carboxyl group concentration of 60 equivalents/ton or less, preferably less than 30 equivalents/ton used in the present invention can be produced by a known method per se, such as one in which appropriate reaction conditions are selected in a melt polycondensation reaction or one in which a melt polycondensation reaction and a solid-phase polycondensation reaction are combined.

(B1) Brominated Epoxy Compound

The brominated epoxy compound as the component (B) used in the present invention is a poly(tetrabromo)bisphenol A epoxy compound represented by the following formula (1):

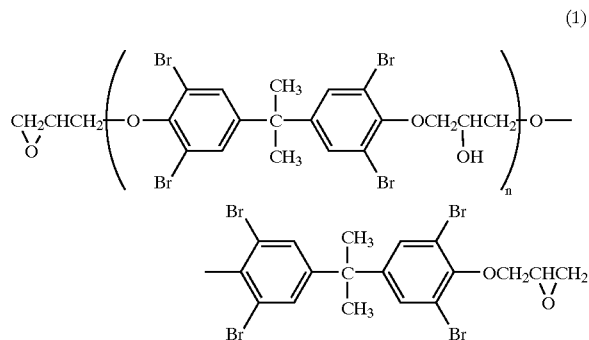

(1)

wherein n is a number of 11 to 50.

This compound can be obtained by mixing tetrabromobisphenol A with tetrabromobisphenol A diglycidyl ether obtained by reacting tetrabromobisphenol A with epichlorohydrin in an amount of 0 to 0.96 equivalent in terms of the hydroxyl group based on 1 equivalent of the epoxy group and reacting them with each other by heating at 100 to 250° C. in the presence of a basic catalyst such as sodium hydroxide, lithium hydroxide or tributylamine.

The average polymerization degree "n" of the brominated epoxy compound is 11 to 50, preferably 11 to 20. When the average polymerization degree is lower than 11, the epoxy equivalent of the brominated epoxy compound becomes large, thereby making it difficult to suppress a reduction in moldability caused by a reaction between the aromatic polyester and the brominated epoxy compound. When the average polymerization degree is higher than 50, the fluidity of the aromatic polyester lowers.

(B2) Brominated Polyacrylate

The brominated polyacrylate as the component (B2) used in the present invention is a polymer represented by the following formula (2), namely, a brominated benzyl acrylate or brominated benzyl methacrylate polymer:

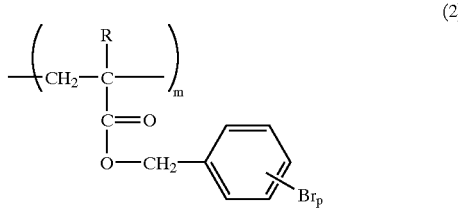

(2)

wherein R is a hydrogen atom or methyl group, p is a number of 1 to 5, and m is a number of 20 to 160.

Illustrative examples of the brominated polyacrylate include polypentabromobenzyl acrylate, polytetrabromobenzyl acrylate, polytribromobenzyl acrylate, polypentabromobenzyl methacrylate and the like. Out of these, polypentabromobenzyl acrylate is particularly preferred.

This brominated polyacrylate may be copolymerized with a small amount of another vinyl-based monomer. The amount of the vinyl-based monomer is preferably 10 mol % or less.

The average polymerization degree "m" of the brominated polyacrylate is 20 to 160, preferably 50 to 120. When the average polymerization degree is lower than 20, the heat resistance of the aromatic polyester lowers and when the average polymerization degree is higher than 160, the fluidity of the aromatic polyester lowers.

The total amount of the brominated epoxy compound (B1) and the brominated polyacrylate (B2) as flame retardants is 5 to 50 parts by weight based on 100 parts by weight of the aromatic polyester (A). When the total amount is smaller than 5 parts by weight, the effect of flame retarding the aromatic polyester becomes unsatisfactory and when the total amount is larger than 50 parts by weight, such a defect as deterioration in the mechanical properties of the composition appears. The blending ratio of the component (B1) to the component (B2) is 95/5 to 5/95, preferably 50/50 to 95/5. When the blending ratio is outside the above range, the moldability improving effect of the present invention is not fully exhibited.

(C) Antimony Trioxide

The amount of the antimony trioxide (C) is 2 to 20 parts by weight based on 100 parts by weight of the aromatic polyester (A). When the amount is smaller than 2 parts by weight, the effect of the flame retarding aid is not fully exhibited and when the amount is larger than 20 parts by weight, such a defect as deterioration in the mechanical properties of the composition appears. Antimony trioxide having a purity of 98% or more and a particle diameter of 0.1 to 5 $\mu$m is preferred as the component (C). Antimony trioxide having a purity of 99% or more and a particle diameter of 0.5 to 3 $\mu$m is particularly preferred.

(D) Fibrous Inorganic Filler

In the second composition of the present invention, the fibrous inorganic filler (D) is blended in an amount of 5 to 100 parts by weight based on 100 parts by weight of the aromatic polyester (A). Thereby, a composition which is superior to the first composition in heat resistance and mechanical properties is obtained advantageously.

Illustrative examples of the fibrous inorganic filler include glass fiber, carbon fiber, steel fiber, asbestos, ceramic fiber, potassium titanate whisker, boron whisker, aluminum borate whisker, calcium carbonate whisker and the like. They may be used alone or in combination of two or more.

Out of the above fibrous reinforcements, glass fiber is preferred. Any glass fiber may be used if it is generally used to reinforce resins. It is selected from among long fiber type (glass roving), short-fiber chopped strand and milled fiber.

Fibrous reinforcements such as glass fiber may be treated with a binder (such as a polyvinyl acetate or polyester binder), coupling agent (such as a silane compound, Volan compound or titanium compound) or other surface treating agent.

Other Components

A pigment and other compounding agents may be added to the composition of the present invention as required in such amounts that they develop their effects. The compounding agents include a powdery, particular or lamellar inorganic filler such as kaolin, clay, wollastonite, talc, mica, calcium carbonate, barium sulfate, glass beads or glass flakes.

The filler is blended as a reinforcement, surface modifier or modifier for improving electric and thermal properties. It should be blended in a range from the minimum amount for developing its effect by blending to an amount that the excellent characteristic properties and molding advantages of the composition are not lost by blending excessively.

Other flame retardants such as polycarbonate oligomers produced from brominated polystyrene, brominated polyphenylene ether and brominated bisphenol-A; halogen-containing compounds such as dimers of brominated bisphenyl ether, brominated diphthalimide compound and chlorinated hexapentadiene; phosphorus compounds such as red phosphorus and triphenyl phosphate; phosphorus-nitrogen compounds such as phosphonic acid amide; triazine compounds such as melamine, melam, melam, mellon, cyanuric acid and melamine cyanurate; metal hydroxides such as aluminum hydroxide, magnesium hydroxide, dawsonite and gypsum dihydrate, and flame retarding aids other than antimony trioxide, such as metal oxides including antimony tetraoxide, antimony pentoxide, sodium antimonate, boron oxide and iron oxide may be blended in limits that do not impair moldability and the like. To further improve the effect of the flame retardant, a compound which suppresses dripping of molten particles at the time of burning may be blended. Examples of the compound which exhibits this effect include known polytetrafluoroethylene and fumed colloidal silica which are produced by emulsion polymerization.

To improve heat resistance, an antioxidant or thermal stabilizer such as a hindered phenol compound, aromatic amine compound, organic phosphorus compound or sulfur compound may further be added. To improve melt viscosity stability and hydrolysis resistance, an epoxy compound or oxazoline compound may be added. Preferred example of the epoxy compound include a bisphenol A type epoxy compound obtained from a reaction between bisphenol A and epichlorohydrin, aliphatic glycidyl ethers obtained from a reaction between glycols and glycerol epichlorohydrin, novolak type epoxy compounds, aromatic and aliphatic carboxylic acid type epoxy compounds, alicyclic compound type epoxy compounds and the like. The oxazoline compound is preferably an aromatic or aliphatic bisoxazoline, particularly preferably 2,2'- bis(2-oxazoline) or 2,2'-m-phenylenebis(2-oxazoline).

Other stabilizer, colorant, lubricant, ultraviolet light absorber and antistatic agent may also be added.

Further, a small amount of another thermoplastic resin, for example, another polyester resin, polyamide resin, polyphenylene sulfide resin, polyphenylene ether resin, polycarbonate resin, phenoxy resin, polyethylene or copolymer thereof, polypropylene or copolymer thereof, polystyrene or copolymer thereof, acrylic resin or acrylic copolymer, polyamide elastomer, polyester elastomer; or thermosetting resin such as phenolic resin, melamine resin, unsaturated polyester resin or silicon resin may be added.

Preferably, these compounding ingredients are uniformly dispersed in the resin composition of the present invention. Any compounding method may be used. For example, all or part of the compounding ingredients are supplied to a heated single or double-screw extruder en bloc or separately and homogenized by melt kneading and the obtained molten resin extruded into a wire form is solidified by cooling, cut to a desired length and granulated. A mixer such as a blender, kneader or roll may be used. These methods may be used in combination or repeated a plurality of times to add the compounding ingredients sequentially.

To obtain a resin molded product from the thus produced resin composition for molding, the resin composition is supplied to a molding machine such as an injection molding machine while it is fully kept dry. Further, the constituent raw materials of the composition may be dry blended and directly injected into the hopper of a molding machine to be melt kneaded together in the molding machine.

The resin composition of the present invention preferably exhibit its characteristic features in the molding method using a regenerated material or recovered material. The regenerated material is a ground product of a non-product part such as a sprue or runner generated at the time of molding or pelletized product obtained by re-extruding it.

Although use of the regenerated material is effective in making use of resin composition raw materials and reducing the amount of waste, the resin composition is molten repeatedly, whereby the characteristic properties of the resin tend to deteriorate.

Underwriter Laboratories (UL) of the US which authorizes the characteristic properties of plastic materials permits use of 25 wt % or less of a regenerated material as a raw material for a molded product. When a regenerated material is used in an amount of more than 25 wt % as a raw material for a molded product, confirmation is required separately.

When a composition obtained by flame retarding the aromatic polyester (A) with the brominated epoxy compound (B1) is molten repeatedly, a phenomenon that its melt viscosity increases appears markedly. Since use of a regenerated material inevitably involves re-melting of the regenerated material, it has been difficult to use a material regenerated from the composition. A composition obtained by flame retarding the aromatic polyester (A) with the brominated polyacrylate (B2) has poor residence stability and experiences a great reduction in melt viscosity. Therefore, it has been difficult to use a material regenerated from this composition as well.

However, the resin composition of the present invention has high residence stability while retaining high fluidity. Even when a regenerated material is used for molding in an amount of more than 25 wt %, the advantage of high residence stability can be obtained. The amount of a regenerated material used is preferably 50 wt % or less. When the amount of a regenerated material is more than 50 wt %, the characteristic properties of the resin composition of the present invention greatly lower disadvantageously.

The present invention further provides a molding method using a regenerated material in an amount of more than 25 wt % and 50 wt % or less as a raw material for molding when a flame-retardant polyester resin composition is to be molded. It is a fundamental rule to use a resin composition containing the same type of flame retardant in the same amount as a regenerated material. Additives may be added in small amounts that do not impair the characteristic properties of the resin composition of the present invention.

In other words, the molding method of the present invention is a method of producing a molded product from the flame-retardant polyester resin composition of the present invention in an amount of 50 wt % or more and less than 75 wt % based on the total weight of all the raw materials as a raw material for molding and a material regenerated from the flame-retardant polyester resin composition in an amount of more than 25 wt % and 50 wt % or less based on the total weight of all the raw materials as a raw material for molding.

EXAMPLES

The following examples are given to further illustrate the present invention. Characteristic properties in the examples are measured in accordance with the following methods.

(1) mechanical properties: A tensile test is based on ASTM D638 and an impact test is based on ASTM D256 (Izod, notched).
(2) load deflection temperature: based on ASTM D648. 1.82 MPa.
(3) flammability: evaluated by a method specified by the Underwriter Laboratories of the US (UL94) (thickness of test sample: 0.8 mm)
(4) intrinsic viscosity: measured in o-chlorophenol as a solvent at 35° C. by an Ostwald's viscometer.
(5) melt viscosity: measured under a load of 100 kgf at a nozzle L/D of 10/1 mm, a temperature of 250 to 270° C. and a residence time of 5 to 20 minutes by the CFT-500A flow tester (of Shimadzu Corporation).

Examples 1 to 6 and Comparative Examples 1 to 8

2,600 parts by weight of dimethyl terephthalate, 1,800 parts by weight of 1,4-butanediol and 1.9 parts by weight of tetra-n-butyl titanate were charged into an ester exchange reactor to carry out an ester exchange reaction at 170° C. for 180 minutes. Methanol formed during the reaction was distilled out to the outside of the reaction system and the ester exchange reaction was terminated. The amount of methanol which distilled out at the end of the reaction was 740 parts by weight. To carry out a polycondensation reaction thereafter, the reaction solution was transferred to a polycondensation reactor and the reaction temperature was elevated from 170° C. to 245° C. over 35 minutes by gradually increasing the degree of vacuum. A polycondensation reaction was continued by maintaining this temperature and maintaining the degree of vacuum at 1 mmHg or less to produce polytetramethylene terephthalate (PBT) resins A1 and A2. Thereafter, the pressure was returned to normal level by nitrogen and increased to discharge a strand-form polymer from the slit of a discharge section and chip it. The obtained PBT resins A1 and A2 had intrinsic viscosities of 0.72 and 0.88 and terminal carboxyl group concentrations [COOH] of 42 equivalents/ton and 52 equivalents/ton, respectively.

2,600 parts by weight of dimethyl terephthalate, 1,800 parts by weight of 1,4-butanediol and 1.9 parts by weight of tetra-n-butyl titanate were charged into an ester exchange reactor to carry out an ester exchange reaction at 170° C. for 180 minutes. Methanol formed during the reaction was distilled out to the outside of the reaction system. Before the end of the reaction, 1.50 parts by weight of potassium acetate was added to terminate the ester exchange reaction. The amount of methanol which distilled out at the end of the reaction was 740 parts by weight. To carry out a polycondensation reaction thereafter, the reaction solution was transferred to a polycondensation reactor and the reaction temperature was elevated from 170° C. to 245° C. over 35 minutes by gradually increasing the degree of vacuum. A polycondensation reaction was continued by maintaining this temperature and maintaining the degree of vacuum at 1 mmHg or less to produce PBT resin A3. Thereafter, the pressure was returned to normal level by nitrogen and increased to discharge a strand-form polymer from the slit of a discharge section and chip it. The obtained PBT resin A3 had an intrinsic viscosity of 0.69 and a terminal carboxyl group concentration [COOH] of 19 equivalents/ton.

The above PBT resin (A1, A2, A3) which was dried with hot air at 130° C. for 8 hours, brominated epoxy compound, brominated polyacrylate (polypentabromobenzyl acrylate: FR1025: molecular weight of about 34,000, polymerization degree of about 60: manufactured by Dead Sea Bromin Co., Ltd. of Israel), antimony trioxide (PATOX-C: manufactured by Nippon Seiko Co., Ltd.), glass fiber (13 μm-diameter, 3 mm chopped strand: manufactured by Nippon Electric Glass Co., Ltd.) and polytetrafluoroethylene (FA100: manufactured by Daikin Industries, Ltd.) were uniformly mixed together by a tumbler in a ratio shown in Table 1 and melt kneaded at a cylinder temperature of 260° C., a turn over number of screw revolution of 150 rpm and a discharge rate of 50 kg/hr while the mixture was drawn under vacuum using a vented double-screw extruder having a screw diameter of 44 mm, and a thread discharged from a dice was cooled and cut to obtain pellets for molding.

The pellets were used to form a molded product for the measurement of characteristic properties by the IS60B injection molding machine of Toshiba Machine Co., Ltd. having a shot capacity of 5 ounce at a cylinder temperature of 260° C., a mold temperature of 80° C., an injection pressure of 60 MPa, a cooling time of 12 seconds and a total molding cycle of 35 seconds.

The characteristic properties were measured using these pellets and molded product. The results are shown in Table 1.

When a brominated epoxy compound is blended in the presence of antimony trioxide, the viscosity of the obtained composition is greatly changed by residence (Comparative Examples 1 to 3) though PBT having a terminal carboxyl group concentration [COOH] of 52 equivalents/ton is used. When a brominated epoxy compound having a high degree of polymerization is used, the viscosity of the obtained composition itself becomes high (Comparative Example 4) though an increase in viscosity is not seen. When a brominated polyacrylate is used in place of the brominated epoxy compound, a composition having excellent fluidity is obtained but its viscosity is lowered by residence (Comparative Example 5). However, when a brominated epoxy compound and a brominated polyacrylate are used in combination, a composition which is excellent in both fluidity and residence stability can be obtained (Examples 1 to 3) if the brominated epoxy compound having an appropriate degree of polymerization is used though an increase in viscosity is still seen with a brominated epoxy compound having a low degree of polymerization (Comparative Example 6). The same effect is obtained by changing the type of PBT (Comparative Examples 7 and 8, Examples 4 to 6). The obtained compositions are satisfactory in terms of mechanical properties and heat resistance.

TABLE 1

| | composition (part by weight) | | | | | |
|---|---|---|---|---|---|---|
| | component (A) PBT resin (type) | component (B) brominated epoxy compound (type) | component (C) brominated polyacrylate | component (D) antimony trioxide | glass fiber | PTFE |
| C. Ex. 1 | 100 (A1) | 26 (B1) | — | 12 | 60 | — |
| C. Ex. 2 | 100 (A1) | 26 (B2) | — | 12 | 60 | — |
| C. Ex. 3 | 100 (A1) | 26 (B3) | — | 12 | 60 | — |
| C. Ex. 4 | 100 (A1) | 26 (B4) | — | 12 | 60 | — |
| C. Ex. 5 | 100 (A1) | — | 26 | 12 | 60 | — |
| C. Ex. 6 | 100 (A1) | 20 (B1) | 6 | 12 | 60 | — |
| Ex. 1 | 100 (A1) | 20 (B2) | 6 | 12 | 60 | — |
| Ex. 2 | 100 (A1) | 14 (B2) | 12 | 12 | 60 | — |
| Ex. 3 | 100 (A1) | 20 (B3) | 6 | 12 | 60 | — |
| C. Ex. 7 | 100 (A2) | 25 (B2) | — | 10 | 60 | 0.6 |
| Ex. 4 | 100 (A2) | 17 (B2) | 8 | 10 | 60 | 0.6 |
| C. Ex. 8 | 100 (A2) | 25 (B3) | — | 10 | 60 | 0.6 |
| Ex. 5 | 100 (A2) | 17 (B3) | 8 | 10 | 60 | 0.6 |
| Ex. 6 | 100 (A3) | 17 (B2) | 8 | 12 | 60 | — |

| | characteristic properties of molded product | | | | |
|---|---|---|---|---|---|
| | melt viscosity 5 minutes of residence/ 20 minutes of residence (test temperature) | flammability UL94 0.8 mm | load deflection temperature (° C.) | tensile strength (MPa) | notched Izod impact strength (MPa) |
| C. Ex. 1 | 253/418 (250° C.) | V-0 | >205 | 125 | 68 |
| C. Ex. 2 | 279/402 (250° C.) | V-0 | >205 | 130 | 74 |
| C. Ex. 3 | 343/412 (250° C.) | V-0 | >205 | 135 | 76 |

TABLE 1-continued

| | | | | | |
|---|---|---|---|---|---|
| C. Ex. 4 | 371/355 (250° C.) | V-0 | >205 | 130 | 79 |
| C. Ex. 5 | 229/179 (250° C.) | V-0 | >205 | 135 | 80 |
| C. Ex. 6 | 267/379 (250° C.) | V-0 | >205 | 130 | 78 |
| Ex. 1 | 273/294 (250° C.) | V-0 | >205 | 135 | 81 |
| Ex. 2 | 268/275 (250° C.) | V-0 | >205 | 135 | 80 |
| Ex. 3 | 279/276 (250° C.) | V-0 | >250 | 135 | 79 |
| C. Ex. 7 | 116/168 (270° C.) | V-0 | >205 | 135 | 77 |
| Ex. 4 | 101/116 (270° C.) | V-0 | >205 | 140 | 82 |
| C. Ex. 8 | 280/371 (270° C.) | V-0 | >205 | 135 | 77 |
| Ex. 5 | 255/264 (270° C.) | V-0 | >205 | 140 | 81 |
| Ex. 6 | 220/209 (250° C.) | V-0 | >205 | 130 | 76 |

C. Ex.: Comparative Example
Ex.: Example

PBT Resin

A1 . . . intrinsic viscosity of 0.72, terminal carboxyl group concentration [COOH] of 42 equivalents/ton
A2 . . . intrinsic viscosity of 0.88, terminal carboxyl group concentration [COOH] of 52 equivalents/ton
A3 . . . intrinsic viscosity of 0.69, terminal carboxyl group concentration [COOH] of 19 equivalents/ton brominated epoxy compound:
B1 . . . F2300 (molecular weight of 3,200 to 4,000, polymerization degree "n" of about 4 to 6: Dead Sea Bromine Co., Ltd. of Israel)
B2 . . . Plasarm EP100 (molecular weight of 10,000, polymerization degree "n" of about 16: Dainippon Ink and Chemicals, Inc.)
B3 . . . F2300H (molecular weight of 18,000 to 25,000, polymerization degree "n" of about 30 to 40: Dead Sea Bromine Co., Ltd. of Israel)
B4 . . . F2400 (molecular weight of 40,000 to 60,000, polymerization degree "n" of about 65 to 100: Dead Sea Bromine Co., Ltd. of Israel)

The results obtained when the pellets of these resin compositions were mixed with materials regenerated from the same compositions and molded are shown below. The inflow length of a 10 mm wide and 0.5 mm thick strip-like molded product was measured by the AS-MATE15D of Fanuc Ltd. when the molded product was molded at a cylinder temperature of 270° C., a mold temperature of 60° C. and a molding cycle of 42 seconds. As for the molding method, the first molded product is ground, and a 1:1 mixture of pellets of a raw material resin composition and the ground product was used for second molding. A molded product containing 50% of a regenerated material (ground product) was formed by 1:1 mixing and molding the above raw material pellets and a ground product of the previous molded product likewise. As is obvious from the results of Table 2, when the composition is flame retarded with a brominated epoxy compound or brominated polyacrylate, a change in fluidity is large but when both are used in combination, fluidity is stable. This shows that stable production is possible without changing conditions because there are no changes in molding conditions at the time of production (Comparative Example 2, Comparative Example 6, Example 1).

TABLE 2

| | composition (parts by weight) | | | | | |
|---|---|---|---|---|---|---|
| | component (A) PBT resin (type) | component (B) brominated epoxy compound | component (C) brominated polyacrylate | component (D) antimony trioxide | glass fiber | PTFE |
| C. Ex. 2 | 100 (A1) | 26 (B2) | — | 12 | 60 | — |
| C. Ex. 5 | 100 (A1) | — | 26 | 12 | 60 | — |
| Ex. 1 | 100 (A1) | 20 (B2) | 6 | 12 | 60 | — |

| | moldability when regenerated material is used | | |
|---|---|---|---|
| | inflow length of first molded product (mm) | inflow length of second molded product (mm) | inflow length of eighth molded product (mm) |
| C. Ex. 2 | 54.8 | 49.7 | 57.3 |
| C. Ex. 5 | 61.9 | 64.9 | 74.0 |
| Ex. 1 | 50.0 | 51.9 | 52.7 |

C. Ex.: Comparative Example
Ex.: Example

Example 7 and Comparative Example 9

Pellets for molding were obtained from components (composition) shown in Table 3 in the same manner as in Examples 1 to 6. The pellets were subjected to a residence test shown in Table 3 to measure changes in the intrinsic viscosity of the obtained molded product. The results are shown in Table 3.

TABLE 3

| | component (A) PBT resin (type) | component (B) brominated epoxy compound | component (C) brominated polyacrylate | component (D) antimony trioxide | antimony pentoxide | glass fiber | PTFE |
|---|---|---|---|---|---|---|---|
| Ex. 7 | 100 (A3) | 15 (B2) | 7.7 | 4.6 | — | 35 | 0.5 |
| C. Ex. 9 | 100 (A3) | 24.4 (B2) | — | — | 12.2 | 35 | — |

| | residence test (changes in intrinsic viscosity caused by molding residence) | | | |
|---|---|---|---|---|
| | 0 minutes | 10 minutes | 20 minutes | 30 minutes |
| Ex. 7 | 0.69 | 0.66 | 0.65 | 0.65 |
| C. Ex. 9 | 0.87 | 0.62 | 0.45 | 0.43 |

C. Ex.: Comparative Example
Ex.: Example
*antimony pentoxide/Sun Epoc NA1030 of Nissan Chemical Industries, Ltd.
*intrinsic viscosity measuring method measured using a viscometer (micro-Ubbelohde's viscometer manufactured by Asahi Seisakusho Co., Ltd. The intrinsic viscosity is calculated from a measurement value in orthochlorophenol at 35° C.
*residence test method
A 50 mm diameter and 3 mm thick disk molded product was molded using a molding machine (IS60B of Toshiba Corporation) at a cylinder temperature of 260° C. and an injection pressure of 800 kg/cm². The residence time was calculated from the completion of metering.

According to the present invention, there can be provided a flame-retardant polyester resin composition which has extremely excellent moldability though antimony trioxide is used as a flame retardant. That is, there can be provided a flame-retardant polyester resin composition which has excellent residence stability and high fluidity which cannot be obtained by a brominated epoxy compound alone without causing an increase or decrease in viscosity by a reaction with the flame retardant.

What is claimed is:

1. A flame-retardant polyester composition comprising:

(A) 100 parts by weight of an aromatic polyester having a terminal carboxyl group concentration of 60 equivalents/ton or less;
   (B) 5 to 50 parts by weight of flame retardants consisting of (B1) a brominated epoxy compound represented by the following formula (1):

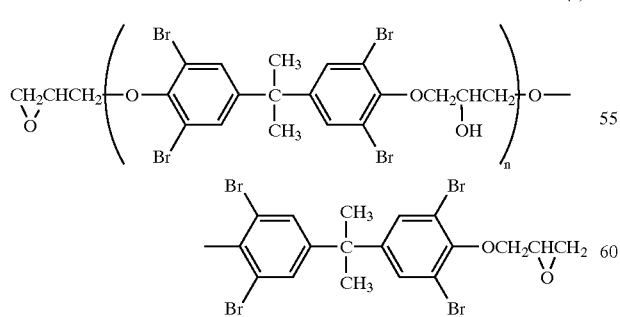

wherein n is a number of 11 to 50, and (B2) a brominated polyacrylate represented by the following formula (2):

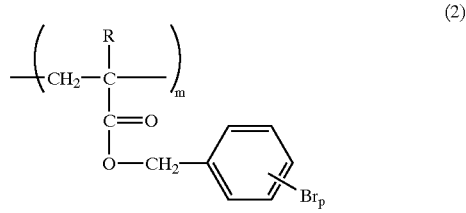

wherein R is a hydrogen atom or methyl group, p is a number of 1 to 5, and m is a number of 20 to 260, the (B1)/(B2) weight ratio being 5/95 to 95/5; and
   (C) 2 to 20 parts by weight of a flame retardant aid consisting of antimony trioxide.

2. A flame-retardant polyester composition comprising:

(A) 100 parts by weight of an aromatic polyester having a terminal carboxyl group concentration of 60 equivalents/ton or less;
   (B) 5 to 50 parts by weight of flame retardants consisting of (B1) a brominated epoxy compound represented by the following formula (1):

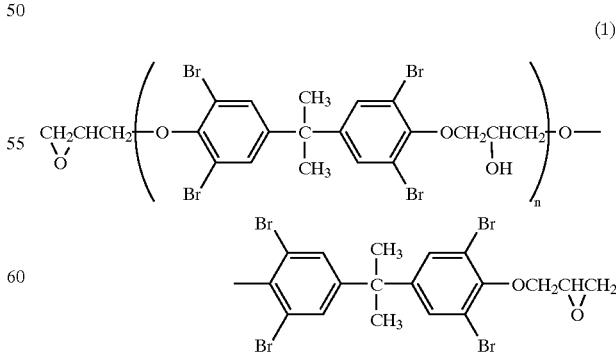

wherein n is a number of 11 to 50, and (B2) a brominated polyacrylate represented by the following formula (2):

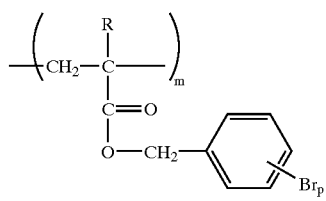

(2)

wherein R is a hydrogen atom or methyl group, p is a number of 1 to 5, and m is a number of 20 to 160, the (B1)/(B2) weight ratio being 5/95 to 95/5;

(C) 2 to 20 parts by weight of antimony trioxide; and (D) 5 to 100 parts by weight of a fibrous inorganic filler.

3. The flame-retardant polyester composition of claim 1 or 2, wherein the brominated polyacrylate is poly (pentabromobenzyl acrylate) (R=H, p=5 in the above formula (2)).

4. The flame-retardant polyester composition of claim 1 or 2, wherein the aromatic polyester (A) is polytetramethylene terephthalate.

5. A method of producing a molded product from a flame-retardant polyester composition, characterized in that a mixture of 50 to 75 wt % of the flame-retardant polyester composition of claim 1 or 2 which is not used for molding yet and 50 to 25 wt % of the flame-retardant polyester composition of claim 1 or 2 which contains the same type of flame retardant in the same amount as the above flame-retardant polyester composition and has already been used for molding and recovered is used as the flame-retardant polyester composition.

6. A method for producing a molded product, which comprises:

recovering as a raw material an amount of the flame-retardant polyester composition of claim 1 or 2 which has already been used for molding; and mixing an additional amount of the flame-retardant polyester composition of claim 1 or 2 which has not been used for molding.

7. A molded product of the flame-retardant polyester composition of claim 1 or 2.

* * * * *